United States Patent
Freimuth et al.

(10) Patent No.: US 10,367,722 B2
(45) Date of Patent: Jul. 30, 2019

(54) OPTIMIZING PERFORMANCE OF COMPUTER NETWORKS

(71) Applicant: International Business Machines Corporation, Armonk, NY (US)

(72) Inventors: Douglas M. Freimuth, New York, NY (US); Dilip D. Kandlur, Yorktown Heights, NY (US); Thai F. Le, White Plains, NY (US); Christian Makaya, Summit, NJ (US); Erich M. Nahum, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 15/443,552

(22) Filed: Feb. 27, 2017

(65) Prior Publication Data
US 2018/0248762 A1 Aug. 30, 2018

(51) Int. Cl.
*H04L 12/26* (2006.01)
*H04L 29/08* (2006.01)
*H04L 12/707* (2013.01)

(52) U.S. Cl.
CPC ............ *H04L 45/24* (2013.01); *H04L 43/087* (2013.01); *H04L 43/0829* (2013.01); *H04L 43/0888* (2013.01); *H04L 67/28* (2013.01)

(58) Field of Classification Search
None
See application file for complete search history.

(56) References Cited

U.S. PATENT DOCUMENTS

| 6,882,627 B2* | 4/2005 | Pieda ..................... H04L 45/00 370/248 |
| 8,848,640 B2 | 9/2014 | Reznik et al. |
| 2009/0285165 A1* | 11/2009 | Berglund ............ H04W 72/082 370/329 |
| 2010/0154044 A1 | 6/2010 | Manku |

(Continued)

OTHER PUBLICATIONS

Amazon Web Services;2017 "Transfer Files into Amazon S3 up to 300% faster"; https://aws:amazon:com/about-aws/whats-new/2016/04/transfer-files-into-amazon-s3-up-to-300-percent-faster/;Posted Apr. 19, 2016, 2 pages.

(Continued)

*Primary Examiner* — Edan Orgad
*Assistant Examiner* — Emmanuel K Maglo
(74) *Attorney, Agent, or Firm* — Cantor Colburn LLP; Grant Johnson

(57) ABSTRACT

Embodiments are directed to a computer-implemented method of optimizing performance of a computer network. The method includes receiving a request to transmit data from a first location. For each path in a set of paths, where each path comprises a connection allowing the transmission of data from the location, a set of performance measures for the path is determined. For each path in the set of paths, an incremental cost of transmitting the requested data using the path is determined. Thereafter, the performance measures and incremental cost for each path is used to determine which path to use to transmit data. Data is then transmitted using the determined path using multipath transmission control protocol techniques (MP-TCP).

15 Claims, 6 Drawing Sheets

(56) References Cited

U.S. PATENT DOCUMENTS

| | | | |
|---|---|---|---|
| 2012/0188949 A1 | 7/2012 | Salkintzis et al. | |
| 2013/0064198 A1 | 3/2013 | Krishnaswamy et al. | |
| 2013/0077501 A1 | 3/2013 | Krishnaswamy et al. | |
| 2015/0245409 A1 | 8/2015 | Medapalli | |
| 2015/0282219 A1 | 10/2015 | Kweon et al. | |
| 2016/0037428 A1 | 2/2016 | Kanugovi et al. | |
| 2017/0290036 A1* | 10/2017 | Han | H04W 72/1215 |
| 2017/0302549 A1* | 10/2017 | Han | H04L 43/0876 |
| 2017/0339219 A1* | 11/2017 | Le | H04L 69/163 |
| 2018/0139136 A1* | 5/2018 | Yong | H04L 47/125 |

OTHER PUBLICATIONS

Andersen et al.; "Resilient Overlay Networks"; 18th ACM Symp. On Operating Systems Principles (SOSP); Oct. 2001; 15 pages.

Banerjee et al.; "The Interdomain Connectivity of PlanetLab Nodes"; Proceedings of the Passive & Active Measurement Workshop-(PAM2004); Apr. 2004, 11 pages.

Banks et al.; "Software Defined WAN: CloudGenix"; http://sdn-wan:cloudgenix:com/rs/911-KCN-503/images/SD-WAN; Jacket Pushers Interactive, LLC; 2015, 27 pages.

Bonaventure "Multipath TCP : An annotated bibliography," Apr. 2015, http://dx.doi.org/10.5281/zenodo.17336, pp. 1-15.

Collins; "The Detour Framework for Packet Rerouting"; Master's thesis, University of Washington; Oct. 29, 1998, 20 pages.

Han et al.; "Topology Aware Overlay Networks"; In INFOCOM 2005. 24th Annual Joint Conference of the IEEE Computer and Communications Societies. Proceedings IEEE, vol. 4, IEEE,http://web.eecs.umich.edu/ famam/pubs/2005-hwj-infocom.pdf; 2005,p. 2554-2565.

Haq et al.; "A Measurement Study of Wide-Area Cloud Paths"; Technical report, Tufts University; 2015, 13 pages.

Haq et al.; "Leveraging the Power of Cloud for Reliable Wide Area Communication"; InProceedings of the 14th ACM Workshop on HotTopics in Networks, HotNets-XIV, New York, NY, USA, 2015, 7 pages.

Le et al. "Experiences Deploying a Transparent Split TCP Middlebox and the Implications for NFV," HotMiddlebox '15 Proceedings of the 2015 ACM SIGCOMM Workshop on Hot Topics in Middleboxes and Network Function Virtualization, pp. 31-36.

Lee et al.; "Diagnosis of TCP Overlay Connection Failures using Bayesian Networks"; In Proceedings of the 2006 SIGCOMM workshop on Mining network data, ACM,http://dl.acm.org/citation.cfm?id=1162683;2006, pp. 305-310.

Li et al.; "CloudCmp: Comparing Public Cloud Providers";In Proceedings of the 10th ACM SIGCOMM Conference on Internet Measurement, IMC '10, pp. 1{14, New York, NY, USA; 2010, pp. 1-14.

Peter et al.; "One Tunnel is (Often) Enough"; In ACM SIGCOMM; 2014, 12 pages.

Potharaju et al.; When the Network Crumbles: An Empirical Study of Cloud Network Failures and their Impact on Services; In Proceedings of the 4th Annual Symposium on Cloud Computing, SOCC '13,New York, NY, USA, 2013, pages 15:1-15:17.

Pucha et al.; "On the Impact of Research Network Based Testbeds on Wide-area Experiments"; In Proceedings of the 6thACM SIGCOMM Conference on Internet Measurement, IMC '06; New York,NY, USA; 2006, pp. 133-146.

Pucha et al.; "Overlay TCP: Ending End-to-End Transport for Higher Throughput"; Poster in ACM SIGCOMM;http://conferences.sigcomm.org/sigcomm/2005/poster-119.pdf.,Aug. 22-26, 2005, 2 pages.

Pucha et al.; "Slot: Shortened Loop Internet Transport using Overlay Networks"; Purdue Univ., West Lafayette, IN, TR-ECE-05-12; http://docslib:purdue:edu/cgi/viewcontent:cgi?article=1066&context=ecetr; 2005, 43 pages.

Raiciu et al. "How Hard Can It Be? Designing and Implementing a Deployable Multipath TCP", In Proceedings of the 9th USENIX conference on Networked Systems Design and Implementation (NSDI'12). USENIX Association, Berkeley, CA, USA, pp. 1-14.

Roy et al.; "On the Placement of Infrastructure Overlay Nodes"; IEEE/ACM Transactions on Networking, vol. 17, No. 4, Aug. 2009, pp. 1298-1311.

Savage et al.; "Detour: a Case for Informed Internet Routing and Transport"; Transport. IEEE Micr; 1999, 10 pages.

Savage et al.; "The End-to-End Effects of Internet Path Selection";In ACM SIGCOMM; 1999, 11 pages.

Talari Networks;"Network controller";http://www:talari:com/products/network-controller:php;2016, 2 pages.

Viptela; "Transport-Agnostic VPNs using Viptela";http://mktg:viptela:com/Transport-Agnostic-SD-WAN;Viptela Inc.,2014, 3 pages.

* cited by examiner

OPTIMIZING PERFORMANCE OF COMPUTER NETWORKS

BACKGROUND

The embodiments described herein relate in general to the field of computing. More specifically, the embodiments described herein relate to systems and methodologies for optimizing the performance of computer networks.

Today's computing systems are typically connected to a network of computers commonly referred to as the Internet. As the Internet becomes more popular, there is more network traffic on the Internet. New techniques to optimize performance in view of increased network traffic are desirable.

SUMMARY

Embodiments are directed to a computer-implemented method of optimizing performance of a computer network. The method includes receiving a request to transmit data from a first location. For each path in a set of paths, where each path comprises a connection allowing the transmission of data from the location, a set of performance measures for the path is determined. For each path in the set of paths, an incremental cost of transmitting the requested data using the path is determined. Thereafter, the performance measures and incremental cost for each path is used to determine which path to use to transmit data. Data is then transmitted using the determined path(s) using multipath transmission control protocol techniques (MP-TCP).

Embodiments are further directed to a computer system for controlling an electronic device. The system includes a memory and a processor system communicatively coupled to the memory. The processor is configured to perform a method that includes receiving a request to transmit data from a first location. For each path in a set of paths, where each path comprises a connection allowing the transmission of data from the location, a set of performance measures for the path is determined. For each path in the set of paths, an incremental cost of transmitting the requested data using the path is determined. Thereafter, the performance measures and incremental cost for each path is used to determine which path to use to transmit data. Data is then transmitted using the determined path using multipath transmission control protocol techniques (MP-TCP).

Embodiments are further directed to a computer program product for displaying a presentation. The computer program product includes a computer-readable storage medium having program instructions embodied therewith, wherein the computer-readable storage medium is not a transitory signal per se. The program instructions are readable by a processor system to cause the processor system to perform a method that includes receiving a request to transmit data from a first location. For each path in a set of paths, where each path comprises a connection allowing the transmission of data from the location, a set of performance measures for the path is determined. For each path in the set of paths, an incremental cost of transmitting the requested data using the path is determined. Thereafter, the performance measures and incremental cost for each path is used to determine which path to use to transmit data. Data is then transmitted using the determined path using multipath transmission control protocol techniques (MP-TCP).

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1A:
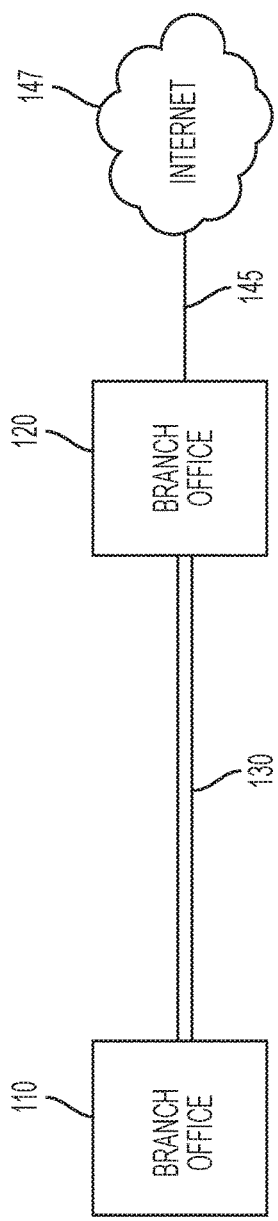
FIG. 1A depicts a block diagram illustrating an exemplary network.

In the accompanying figures and following detailed description of the described embodiments, the various elements illustrated in the figures are provided with three digit reference numbers. The leftmost digits of each reference number corresponds to the figure in which its element is first illustrated.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of one or more embodiments is included herein, implementation of the teachings recited herein are not limited to the embodiments described herein. Rather, embodiments are capable of being implemented in conjunction with many other types of configurations, now known or later developed.

At least the features and combinations of features described in the immediately present application, including the corresponding features and combinations of features depicted in the figures amount to significantly more than optimizing performance and cost in overlay networks. Additionally, at least the features and combinations of features described in the detailed description, including the corresponding features and combinations of features depicted in the figures go beyond what is well understood, routine and conventional in the relevant field(s).

As discussed above, the Internet is used to interconnect many different computers and computing networks. In general, the Internet is a packet-switched network in which data being transmitted from one location to another is first divided into one or more packets of data. The packets of data are routed individually through an interconnected series of computers. Because each packet has address information, the packets will eventually reach their intended destination, where the packets are combined to form the data that was transmitted.

A business or other large entity might be organized as illustrated in FIG. 1A. In FIG. 1A, the entity has two separate locations (also referred to as branch offices) 110 and 120. In the scenario depicted in FIG. 1A, branch office 120 is the main office and branch office 110 is a smaller office. Branch office 120 has the primary connection 145 to the Internet 147. To facilitate communication between branch office 110 and branch office 120, the entity can use a dedicated line 130 from an internet provider. Often, such dedicated lines use a technology called multiprotocol label switching (MPLS). Thereafter, any connections from branch office 110 to the internet can take place over the connection 145 at branch office 120. However, such a dedicated line 130 can become expensive.

Figure 1B:
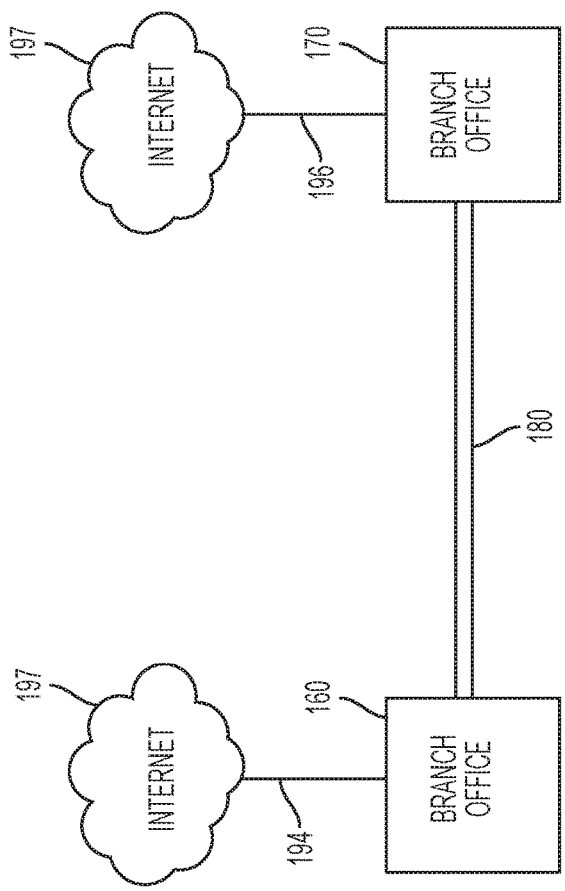
FIG. 1B depicts a block diagram illustrating a software-defined wide area network.

To lessen the costs, the entity might use a software defined wide area network (SD-WAN). An exemplary SD-WAN is illustrated in FIG. 1B. In FIG. 1B, branch office 160 is connected to branch office 170 via a dedicated line 180 (using, for example MPLS). In addition, branch office 160 is connected to Internet 197 via traditional methods (such as via connection 194 through an internet service provider (ISP)). Low priority Internet traffic from the branch office 160 (for example, courtesy Internet access provided to customers), thus travels over connection 194 instead of via MPLS connection 180. In a similar manner, branch office 170 is coupled to Internet 197 via connection 196. MPLS connection 180 provides a faster connection for the higher priority traffic between branch office 160 and branch office 170. The costs of this setup is lower because less traffic is using MPLS connection 180 than MPLS connection 130 of FIG. 1A.

However, the configuration of FIG. 1B has several problems. There is no control of the path from branch office 160 to internet 197 or from branch office 170 to internet 197. Thus, internet traffic is subject to congestion in a manner that is not present in the configuration shown in FIG. 1A.

Embodiments of the present invention address the above-described issues by using a novel method and system to optimizing the performance and costs of overlay networks. A combination of overlay networks, cloud networks, and other internet providers can be used along with performance enhancement proxy nodes in order to send data in order to transmit and receive data in a manner that optimizes cost and performance.

Figure 2:
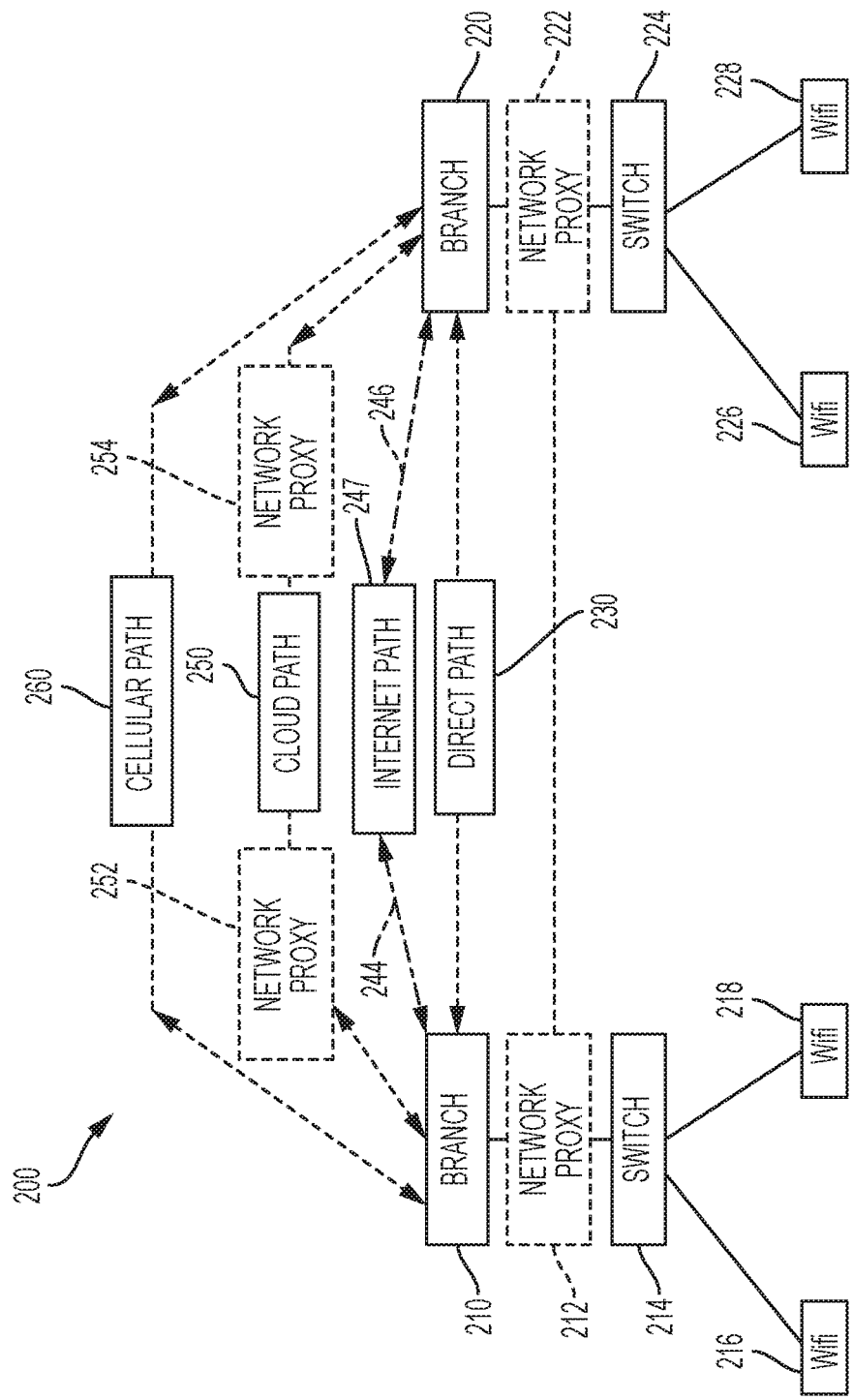
FIG. 2 depicts a block diagram illustrating an exemplary network of one or more embodiments.

FIG. 2 is a block diagram of a system 200 using an embodiment of the present invention. Branch office 210 and branch office 220 roughly correspond to branch office 110 and branch office 120 of FIG. 1A. While only two branch offices are illustrated in FIG. 2, it should be understood that more than two branch officers can be present in an embodiment.

Each of the branch offices 210 and 220 are coupled to a variety of different devices. Switch 214 (operating on layers 2-3 of the OSI model) is present that connects multiple computing devices to branch office 210. In addition, switch 214 can be coupled to one or more WiFi access points (216 and 218). Each of WiFi access points 216 and 218 allow one or more computing devices to access branch office 210 without the need to physically connect to branch office 210. A similar configuration is present for branch office 220, with multiple computing devices coupled to branch office 220 via switch 224, and WiFi access points 226 and 228. Each of branch offices 210 and 220 is coupled to other computer networks in a variety of different manners. Dedicated line 230 roughly corresponds to dedicated line 130 of FIG. 1A and allows branch offices 210 and 220 to directly communicate to each other. Internet path 244 allows branch office 210 to communicate with the Internet 247. Similarly, internet path 246 allows branch office 220 to communicate with Internet 247. It should be understood that this is just one particular connection to the Internet and there can be other connections to the Internet. For example, one may have two different internet service providers that provide fiber connection to Internet 247. In addition, one may have multiple internet service providers using different technologies, for redundancy purposes, such as a fiber connection, a coaxial connection, and a satellite connection.

Branch office 210 is coupled to cellular network 260 via connection 262. Similarly, branch office 220 is coupled to cellular network 260 via path 264. Cellular network 260 can utilize any type of technology to connect to the Internet. Exemplary technologies can include WiMax, 3G, 4G, 4G LTE, LTE Advanced, UMTS, and the like. Cellular network 260 provides another means for branch office 210 and branch office 220 to send and receive data.

In addition, branch office 210 is coupled to cloud path 250 via network proxy 252. Similarly, branch office 220 is coupled to cloud path 250 via network proxy 254. Cloud path 254 is a connection to the Internet that is provided by a cloud provider.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

An advantage of a cloud path to the Internet is that the cloud provider often has dedicated, high speed data connections between their various data centers. By paying a set fee for a speed of service, an entity can have the ability to send and receive large amounts of data across large distances without having to deal with normal internet traffic. The trade-off would be that the cost of sending data via cloud path 250 can be higher than sending data through Internet path 247, though possibly a lower cost than sending data via dedicated connection 230. In some embodiments, traffic sent via cloud path 250 is only sent between nodes that belong on the same cloud network. In such instances, data being sent from branch office 210 to branch office 220 would first be sent to a network proxy 252, which is directly coupled to the cloud network, then be sent through cloud path 250 to network proxy 254, which is directly coupled to the cloud network. Thereafter, the data is sent from network proxy 254 to branch office 220.

The above-described possible paths for data to be sent are merely exemplary. It should be understood that there can be additional manners in which to transmit and receive data for both branch office 210 and branch office 220. For example, there can be multiple instances of any of the above described paths, such as multiple cellular paths (each with a different provider), multiple cloud paths (each with a different provider), and the like. In addition, there can be additional ways to connect to the Internet, both those now known and those developed in the future.

These multiple connections are managed through the use of multipath transmission control protocol (MP-TCP) at branch offices 210 and 220. MP-TCP allows branch offices 210 and 220 to dynamically control where data is sent. If data sent from branch office 210 to Internet path 247 is noticed to be too slow, data can be sent via another means, such as cloud path 250 or cellular path 260 or any other internet connection that is not shown. MP-TCP not only routes the packets, but it breaks the connection into two or more pieces, one to an overlay (not illustrated) node and one from the overlay node to the destination. The destination system need not be aware of the existence of the overlay node.

There can also be static techniques or default paths such that certain traffic is automatically sent down a certain path. For example, internal database traffic can be sent via dedicated line 230, because such traffic might be considered priority traffic. Therefore, a method can include analyzing data to be sent to determine if the data meets criteria to be sent using a default path.

In some embodiments, a branch office (such as branch offices 210 and 220) utilizes a module called the network proxy (also called Performance Enhancement Proxy (PEP) in some embodiments) located internal to blocks 210 and 220. The network proxy has several different functions. For example, the network proxy can optimize the performance of the WiFi signals. The network proxy also can optimize the load distribution utilizing MP-TCP. The network proxy can take several criteria into account for this load distribution, such as policy controls, performance, and cost considerations. The network proxy can also split a connection (for example, to be used in a split TCP configuration). In other embodiments, the network proxy can be embodied as network proxies 212 and 222.

Performance can mean various performance metrics tracked by the network proxy. The network proxy can track the ping of packets sent by the network proxy through each of the various connections. The network proxy can determine an error rate of packets being sent through each connection. If packets have to be re-sent, that is another indication of poor performance through a particular connection.

The network proxy takes data from all of the connections and determines which connection through which to send data. In some embodiments, multiple connections can be used. In some embodiments, the network proxy also can take cost data into consideration. In some embodiments, there is a controller that collects performance and usage information from each branch office and cloud proxy to make the determination.

There is a cost involved with sending data of each of the data paths shown in FIG. 2. The cost of each connection is different. In some embodiments, in addition to a monetary cost, there can be a limit to the amount of data that can be sent over a particular connection. In some embodiments, dedicated line 230 is the most expensive option and might only facilitate communication between branch office 210 and branch office 220. In some embodiments, internet path 247 is the most cost effective method of transmitting data via the Internet, but is also more prone to network congestion and other slowdowns. In some embodiments, cloud path 250 is a faster, more reliable method of some types of Internet communications. However, in some embodiments, cloud path 250 has a cap on the amount of data that can be sent through it (or has a graduated pricing plan in which cost per bit rises significantly at a certain point). In some embodiments, cellular path 260 is another method of avoiding delays when a fiber or other wired connection is down. However, in some embodiments, cellular path 260 also has data caps. A similar type of analysis can be performed for other data connections that are not present, but not illustrated in FIG. 2 (such as additional cellular paths, additional Internet paths, and additional cloud paths).

Figure 5:
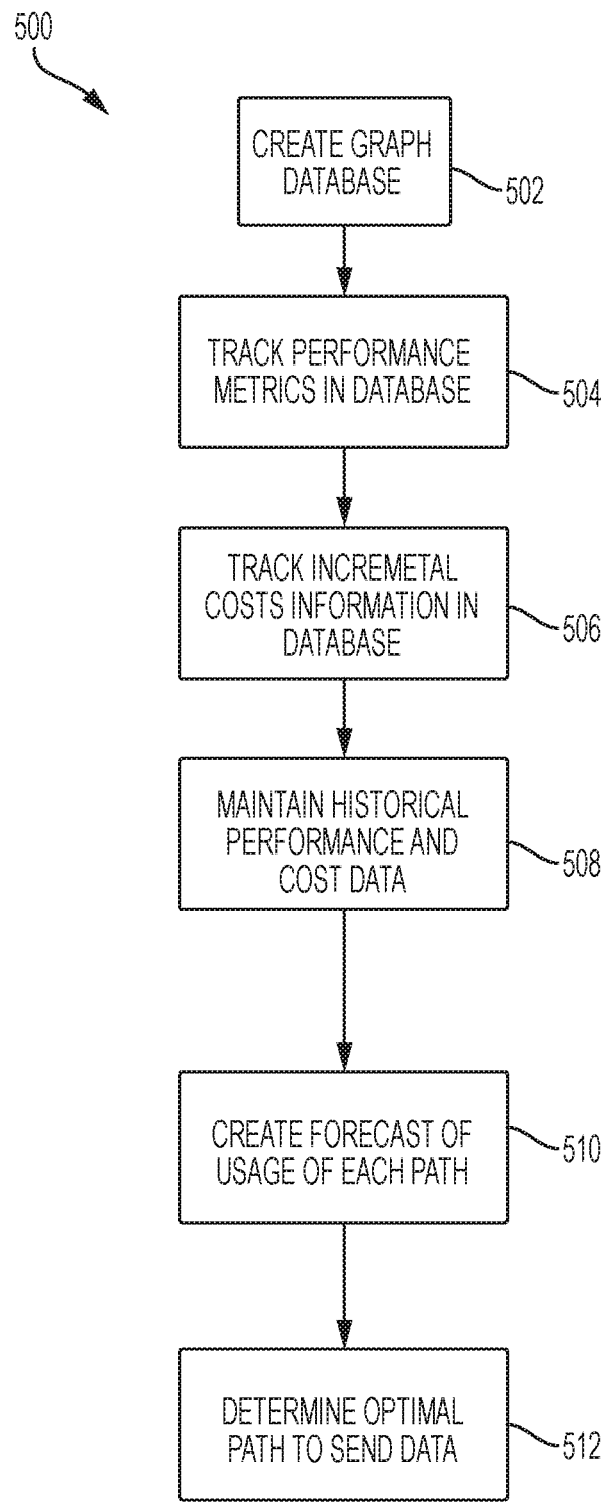
FIG. 5 depicts a flow diagram illustrating the operation of one or more embodiments.

A flowchart illustrating a method 500 of implementing such an algorithm is presented in FIG. 5. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined or skipped.

A graph database is created representing the system (such as system 200) in block 502. Note that while the creation of a graph database is described with respect to FIG. 5, any type of database can be created, including (but not limited to) relational databases, SQL database, NoSQL databases, key-value stores, and document-oriented databases. For each link in the graph database, one or more performance measures are tracked (block 504). Performance measures can include the link throughput. The link throughput can include packet loss rate in some embodiments. Latency (measured, example, using a ping command).

In addition, the incremental cost (the cost for the next bit of data) is also tracked (block 506). This is repeated for every link in the graph. Incremental cost is dependent on usage. Both instantaneous usage (the amount being transmitted now) and cumulative usage (the amount transferred over a particular link over a particular time period). Cost can also be dependent on tiered pricing. For example, the first X number of gigabytes over a specific link can be at a first rate, the next Y number of gigabytes over the same link can be at a second rate. There can also be computing costs associated with a link. Particularly in the case of cloud path 250, certain cloud providers charge for computing costs in addition to port costs and data costs. In order to calculate the incremental cost of a link, historical data regarding the link is maintained and accessed when needed (block 508).

Historical data regarding each link is regularly recorded and stored in a database. As stated above, each link can have different requirements for price points, such as data caps. Determining the cost of sending data over a particular link includes determining the amount of data being sent, determining the billing period, determining the amount of data sent over that link during the billing period. In addition, forecasts can be calculated to determine how much data will be sent before the end of the billing period (block 510).

Thereafter, an optimization can be performed that evaluates the incremental costs, performance metrics, and forecasts can be used to determine the optimal path through which to send data (block 512). In some embodiments, more than one path can be chosen. A variety of different methods can be used to make this determination. There are a variety of algorithms, such as most efficient path algorithms and the like, both now known and those developed in the future, that can be used to make this determination.

Figure 6:
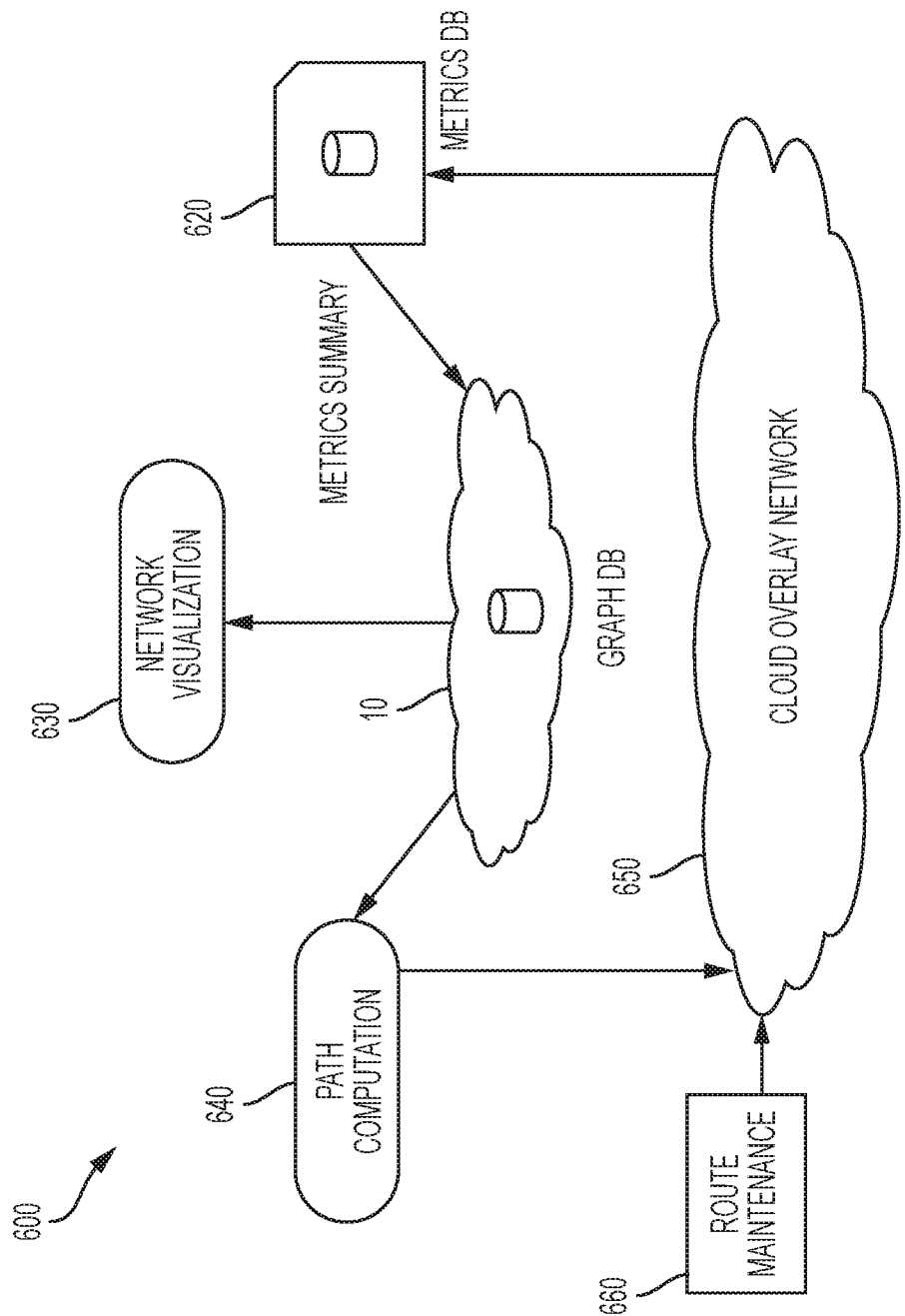
FIG. 6 depicts a diagram illustrating an exemplary structure of a graph database of one or more embodiments.

With reference to FIG. 6, an exemplary graph database structure is shown. Graph database 610 gathers information from a variety of different sources. As illustrated in FIG. 6, a metrics database 620 can be present that continuously monitors cloud overlay network 650 and stores performance data. Graph database 610 is coupled to metrics database 620. Network visualization 630 presents an overview of the network available to graph database 610. Network visualization 630 allows graph database 610 to know the performance of alternative network paths. Path computation 640 gathers data from graph database 610 in order to perform computations and determinations described above. Route maintenance database 660 contains information regarding a status of cloud overlay network 650.

While graph database 610 is illustrated as storing and calculating information regarding cloud overlay network 650 (which operates in a manner similar to cloud path 250 of FIG. 2), it should be understood that graph database 610 also can be configured to store and calculate information multiple paths. Thus, in some embodiments, a single graph database can gather information about each path in a system. In some embodiments, each path can have a separate graph database.

Figure 3:
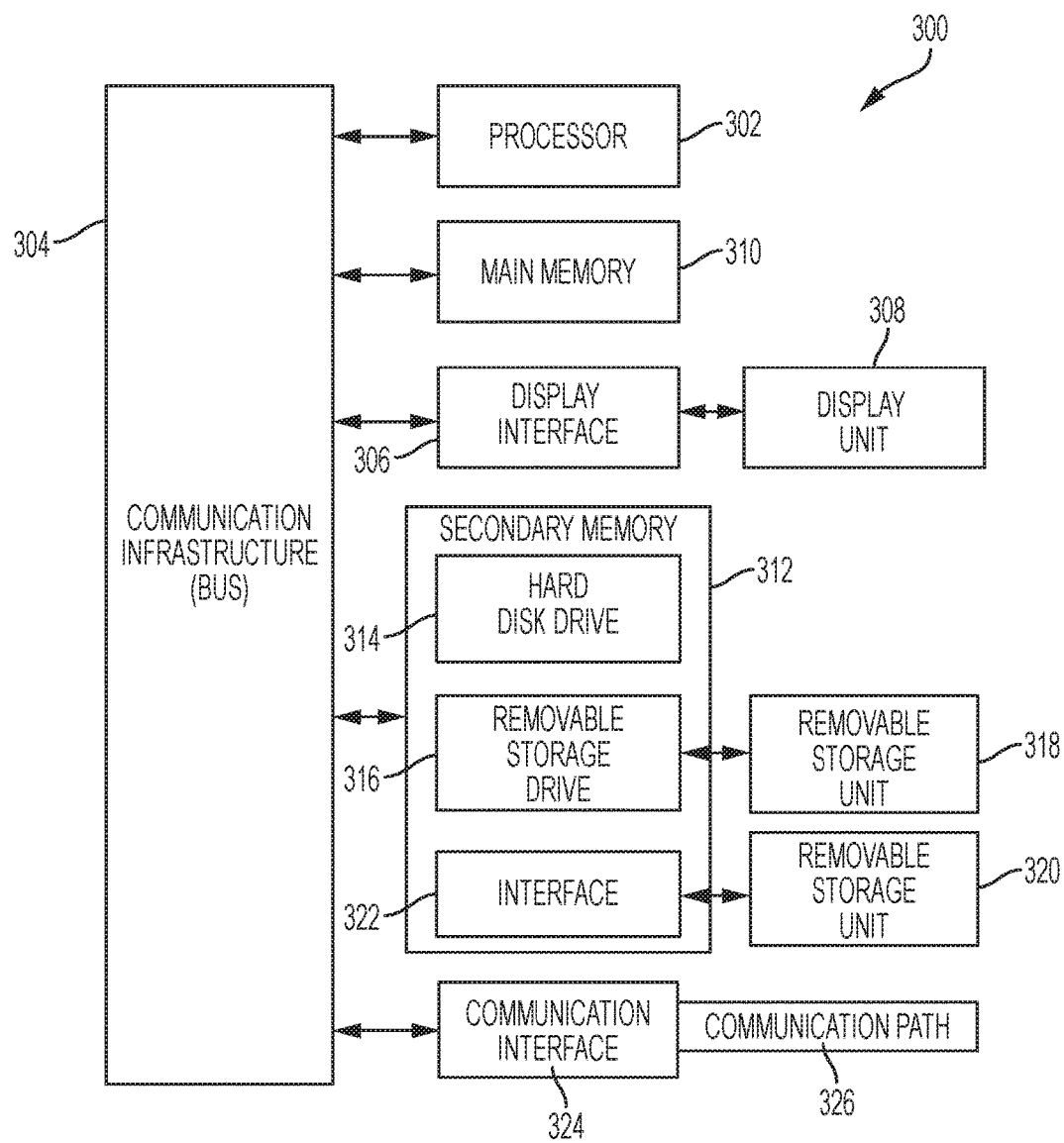
FIG. 3 depicts a computer system capable of implementing hardware components of one or more embodiments.

FIG. 3 depicts a high-level block diagram of a computer system 300, which can be used to implement one or more embodiments. More specifically, computer system 300 can be used to implement hardware components of systems capable of performing methods described herein. In some embodiments, computer system 300 can be located at branch office 210 or branch office 220. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. Computer system 300 can have one of a variety of different form factors, such as a desktop computer, a network switch/router (physical or virtual), a laptop computer, a tablet, an e-reader, a smartphone, a personal digital assistant (PDA), and the like.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via a communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
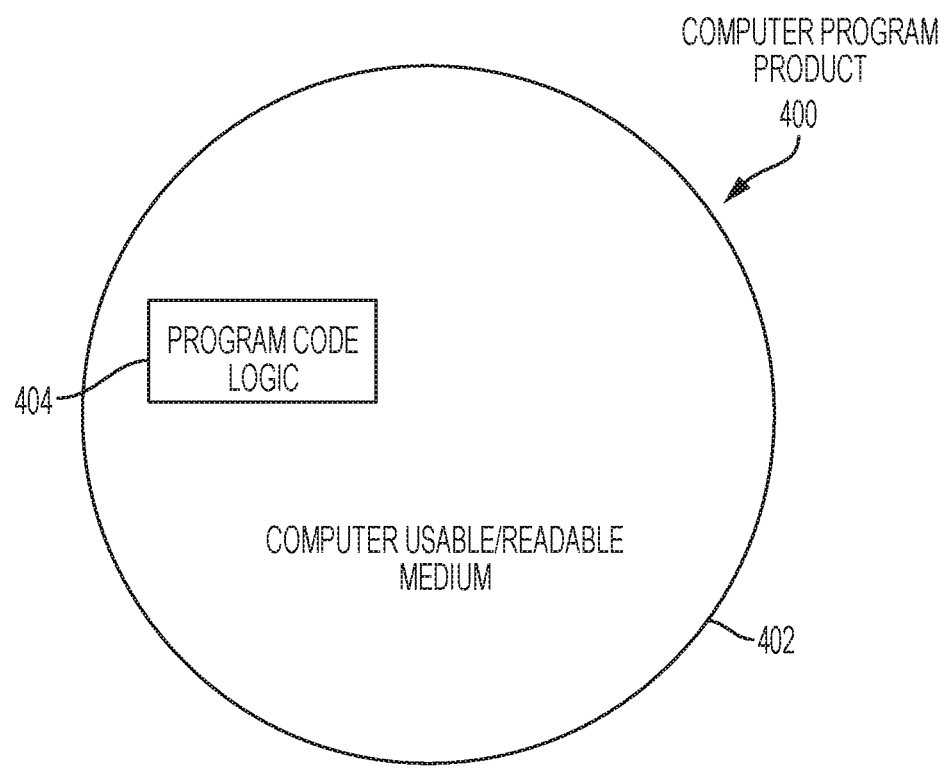
FIG. 4 depicts a diagram of a computer program product according to one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method of optimizing performance of a computer network, the method comprising:
   receiving a request to transmit data from a first location;
   for each path in a set of paths, where each path comprises a connection allowing the transmission of data from the location, determining a set of performance measures for the path;
   for each path in the set of paths, determining an incremental cost of transmitting the requested data using the path;
   using the performance measures and incremental cost for each path to determine which path to use to transmit data; and
   transmitting data using the determined path using multipath transmission control protocol techniques (MP-TCP),
   wherein determining the incremental cost of transmitting the requested data using the path comprises:
      determining an amount of previous data transmitted over the path during a time period;
      determining an allotted amount of data for the time period; and
      determining the cost for transmitting the requested data using the path,
   wherein using the performance measures and incremental cost for each path to determine which path to use to transmit data further comprises analyzing the data to determine if the data meets criteria to be sent via a default path.

2. The computer-implemented method of claim 1, wherein:
   at least one path in the set of paths is an internet connection; and
   at least one path in the set of paths is a cloud path.

3. The computer-implemented method of claim 2, wherein:
   the cloud path is coupled to a network proxy coupled to the first location; and
   the cloud path is further coupled to a network proxy coupled to a second location.

4. The computer-implemented method of claim 1, wherein at least one path in the set of paths is a cellular connection.

5. The computer-implemented method of claim 1, wherein determining a set of performance measures for the path comprises:
   determining a loss rate for transmission on the path;
   determining a throughput of the path; and
   determining a latency of the path.

6. The computer-implemented method of claim 1, wherein using the performance measures and incremental cost for each path to determine which path to use to transmit data further comprises:
   creating a forecast of future data to be sent for each path in the set of paths; and
   using the incremental costs, performance metrics, and forecasts to determine which path to use to transmit data.

7. A computer system for optimizing performance of a computer network, the system comprising: a memory; and a processor system communicatively coupled to the memory; a set of paths from a location, each path comprising a connection allowing the transmission of data to and from the first location; the processor system configured to perform a method comprising: receiving a request to transmit data from a first location; for each path in a set of paths, where each path comprises a connection allowing the transmission of data from the location, determining a set of performance measures for the path; for each path in the set of paths, determining an incremental cost of transmitting the requested data using the path; using the performance measures and incremental cost for each path to determine which path to use to transmit data; and transmitting data using the determined path using multipath transmission control protocol techniques (MP-TCP), wherein determining the incremental cost of transmitting the requested data using the path comprises: determining an amount of previous data transmitted over the path during a time period; determining an allotted amount of data for the time period; and determining the cost for transmitting the requested data using the path,
   wherein using the performance measures and incremental cost for each path to determine which path to use to transmit data further comprises analyzing the data to determine if the data meets criteria to be sent via a default path.

8. The computer system of claim 7, wherein:
   at least one path in the set of paths is an internet connection; and
   at least one path in the set of paths is a cloud path.

9. The computer system of claim 8, wherein:
   the cloud path is coupled to a network proxy coupled to the first location; and
   the cloud path is further coupled to a network proxy coupled to a second location.

10. The computer system of claim 7, wherein at least one path in the set of paths is a cellular connection.

11. The computer system of claim 7, wherein determining a set of performance measures for the path comprises:
    determining a throughput of the path; and
    determining a latency of the path.

12. The computer system of claim 7, wherein using the performance measures and incremental cost for each path to determine which path to use to transmit data further comprises:
    creating a forecast of future data to be sent for each path in the set of paths; and
    using the incremental costs, performance metrics, and forecasts to determine which path to use to transmit data.

13. A computer program product for optimizing performance of a computer network comprising: a computer-readable storage medium having program instructions embodied therewith, wherein the computer-readable storage medium is not a transitory signal per se, the program instructions readable by a processor system to cause the processor system to perform a method comprising: receiving a request to transmit data from a first location; for each path in a set of paths, where each path comprises a connection allowing the transmission of data from the location, determining a set of performance measures for the path; for each path in the set of paths, determining an incremental cost of transmitting the requested data using the; using the performance measures and incremental cost for each path to determine which path to use to transmit data; and transmitting data using the determined path using multipath transmission control protocol techniques (MP-TCP), wherein determining the incremental cost of transmitting the requested data using the path comprises: determining an amount of previous data transmitted over the path during a time period; determining an allotted amount of data for the time period; and determining the cost for transmitting the requested data using the path, wherein using the performance measures and incremental cost for each path to determine which path to use to transmit data further comprises analyzing the data to determine if the data meets criteria to be sent via a default path.

14. The computer program product of claim 13, wherein:

at least one path in the set of paths is an internet connection; and at least one path in the set of paths is a cloud path.

15. The computer program product of claim 14, wherein:

the cloud path is coupled to a network proxy coupled to the first location; and the cloud path is further coupled to a network proxy coupled to a second location.

\* \* \* \* \*

UNITED STATES PATENT AND TRADEMARK OFFICE
CERTIFICATE OF CORRECTION

Page 1 of 1

PATENT NO. : 10,367,722 B2
APPLICATION NO. : 15/443552
DATED : July 30, 2019
INVENTOR(S) : Douglas M. Freimuth et al.

It is certified that error appears in the above-identified patent and that said Letters Patent is hereby corrected as shown below:

On the Title Page

Item (72), Inventors:
Should read as follows:
Douglas M. Freimuth, New York, NY (US);
Dilip D. Kandlur, Yorktown Heights, NY (US);
Franck Vinh Le, White Plains, NY (US);
Christian Makaya, Summit, NJ (US);
Erich M. Nahum, New York, NY (US)

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*